United States Patent
Arai et al.

(10) Patent No.: US 7,747,711 B2
(45) Date of Patent: Jun. 29, 2010

(54) NETWORK CONFIGURATION METHOD AND SYSTEM

(75) Inventors: Daisuke Arai, Saitama (JP); Akira Idoue, Saitama (JP); Takeshi Kouyama, Tokyo (JP); Jun Endou, Tokyo (JP)

(73) Assignee: KDDI Corporation, Tokyo (JP)

( * ) Notice: Subject to any disclaimer, the term of this patent is extended or adjusted under 35 U.S.C. 154(b) by 0 days.

(21) Appl. No.: 12/331,868

(22) Filed: Dec. 10, 2008

(65) Prior Publication Data

US 2009/0150524 A1 Jun. 11, 2009

(30) Foreign Application Priority Data

Dec. 11, 2007 (JP) .............. 2007-319533

(51) Int. Cl.
*G06F 15/177* (2006.01)
(52) U.S. Cl. .............. 709/220; 709/208; 709/217; 709/219; 709/221; 709/222; 709/230; 709/237
(58) Field of Classification Search .......... 709/208, 709/217, 218, 219, 220, 221, 222, 230, 237
See application file for complete search history.

(56) References Cited

U.S. PATENT DOCUMENTS

| | | | | |
|---|---|---|---|---|
| 6,389,464 B1* | 5/2002 | Krishnamurthy et al. | .... | 709/220 |
| 6,694,369 B1* | 2/2004 | Vepa et al. | .......... | 709/228 |
| 7,330,897 B2* | 2/2008 | Baldwin et al. | .......... | 709/229 |
| 2004/0010600 A1* | 1/2004 | Baldwin et al. | .......... | 709/229 |
| 2006/0089869 A1* | 4/2006 | Mundy | .............. | 705/11 |

FOREIGN PATENT DOCUMENTS

| | | |
|---|---|---|
| JP | 7-162448 A | 6/1995 |
| JP | 2001-60968 A | 3/2001 |
| JP | 2001-117885 A | 4/2001 |
| JP | 2002-9808 A | 1/2002 |
| JP | 2002-185522 A | 6/2002 |
| JP | 2004-193988 A | 7/2004 |

OTHER PUBLICATIONS

Rui Campos et al., "Dynamic Autoconfiguration in 4G Networks: Problem Statement and Preliminary Solution", Published: Sep. 2, 2005, pp. 8-11.*
Rui Campos et al., "Dynamic Autoconfiguration . . . ", Published: Sep. 2, 2005.
Internet Initiative Japan Inc., "IIJ SMF sx Service Overview Rev 9.10," pp. 1-61.

* cited by examiner

*Primary Examiner*—Liangche A Wang
(74) *Attorney, Agent, or Firm*—Westerman, Hattori, Daniels & Adrian, LLP

(57) ABSTRACT

An administrator 4 (2) registers configuration files of compliant equipment 31 and noncompliant equipment 32 and a configuration script into a management server, and (3) sends the network equipment to a user 33. When the user 33 constructs the local network 3 by connecting the network equipment and turns it on, (4) a configuration request message is transmitted from the compliant equipment 31 to the management server 2. (5) The management server 2 replies with the configuration file of the compliant equipment 31, the configuration file of the noncompliant equipment 32, and the compliant script to the compliant equipment 31 in response to the configuration request. The compliant equipment 31 (6) registers its own configuration file received from the management server 2 into itself, and then (7) configures the configuration file of the noncompliant equipment 32 into the noncompliant equipment by executing the received configuration script.

6 Claims, 4 Drawing Sheets

NETWORK CONFIGURATION METHOD AND SYSTEM

BACKGROUND OF THE INVENTION

1. Field of the Invention

The present invention relates to a network configuration method and system which enables network configuration by remote control in network equipment noncompliant with a protocol for accepting network configuration remote control.

2. Description of the Related Art

Along with the spread of networks, network construction has been increasingly demanded even for homes and locations such as small-and-medium-sized business establishments which cannot be expected to include the existence of a highly-skilled network administrator. To construct such a local network, configuration of network equipment such as routers and switches, etc., is necessary, however, if the existence of a network administrator cannot be expected, outsourcing to a vendor, etc., is necessary, and cost and the burden of time for network construction hinders smooth introduction of a local network. Even if a network administrator exists, in view of a reduction in introduction costs and operational costs, a technique for automatically configuring network equipment according to configuration information of all network equipment including remote network equipment administered by the network administrator is desired.

Patent documents 1 to 6 and Non-patent document 1 propose network equipment automatic configuration methods for automatically configuring network equipment. FIG. 5 is a block diagram showing the construction of the network configuration system disclosed in Patent document 1, and a management server 2 and a local network 3 are connected to a wide area network 1, and the local network 3 includes only compliant equipment 31a and 31b compliant with an auto-configuration protocol. Network configuration for such a local network 3 is performed according to the following steps.

(1) A network administrator 4 at a remote site registers a configuration file of compliant equipment 31a and 31b into the management server 2 in advance.

(2) The compliant equipment 31a which was turned on performs a query for automatic configuration on the management server 2 when starting or periodically according to an auto-configuration protocol installed in the equipment in advance.

(3) The management server 2 which received the query from the compliant equipment 31a returns a response including the configuration file registered in step (1) to the compliant equipment 31a.

(4) The compliant equipment 31a performs network configuration by registering the configuration file received from the management server 2 into itself according to the auto-configuration protocol.

(5) The steps (2) to (4) are repeated as many as the number of pieces of compliant equipment.

Patent document 1: Japanese Published Unexamined Patent Application No. H07-162448
Patent document 2: Japanese Published Unexamined Patent Application No. 2001-60968
Patent document 3: Japanese Published Unexamined Patent Application No. 2001-117885
Patent document 4: Japanese Published Unexamined Patent Application No. 2002-9808
Patent document 5: Japanese Published Unexamined Patent Application No. 2002-185522
Patent document 6: Japanese Published Unexamined Patent Application No. 2004-193988
Non-patent document 1: Service Specifications (http://www.iij.ad.jp/ICSFiles/afieldfile/2007/07/31/SMF025KA.pdf), SMF sx Service, Internet Initiative Japan Inc., SMF sx Service (http://www.iij.ad.jp/service/system/IIJ-SMF_sx.htmsl)

In the conventional technique described above, when a plurality of pieces of network equipment arranged in a local network is automatically configured, all network equipment must be compliant with an auto-configuration protocol. However, most local networks for homes or small-and-medium-sized business locations are multi-vendors constructed by combining a plurality of vendors, routers, and switches, and include network equipment noncompliant with the auto-configuration protocol. If even one piece of noncompliant equipment is included, as in the conventional technique, this poses a technical problem in which commissioning to a vendor such as dispatch of a network administrator with high operation skills to the location is necessary.

SUMMARY OF THE INVENTION

An object of the present invention is to provide a network configuration method and system which enables automatic configuration in equipment noncompliant with automatic configuration via compliant equipment even when a local network includes the noncompliant equipment.

According to the present invention, in a network configuration method in which a management server and a local network are connected to a network, and compliant and noncompliant equipment which are arranged on the local network and compliant with and noncompliant with an auto-configuration protocol are automatically configured via the network from the management server, the following measures are taken:

(1) a step in which the compliant equipment transmits a Configuration request to the management server; a step in which the management server replies with configuration information of the compliant equipment and configuration information of the noncompliant equipment in response to the configuration request; a step in which the compliant equipment receives its own configuration information and the configuration information of the noncompliant equipment from the management server; a step in which the compliant equipment configures its own received configuration information into itself; a step in which the compliant equipment establishes a communication channel between it and the noncompliant equipment; and a step in which the compliant equipment configures the received configuration information of the noncompliant equipment into the noncompliant equipment via the communication channel.

(2) a step in which the management server replies with a configuration script describing a step of configuring the noncompliant equipment by the compliant equipment in response to the configuration request, where the compliant equipment configures the noncompliant equipment according to the configuration script.

(3) the compliant equipment transmits a configuration request containing its own identification information to the management server, and the management server replies with configuration information of the compliant equipment linked to the identification information contained in the received configuration request and configuration information of the noncompliant equipment.

According to the present invention, the following effects are obtained.

(1) Even when a local network includes network equipment noncompliant with the auto-configuration protocol, this noncompliant equipment can be automatically configured via compliant equipment from a management server at a remote site.

(2) Not only configuration information of the noncompliant equipment but also a configuration script describing a step of configuring the noncompliant equipment by the compliant equipment are transmitted from the management server to the compliant equipment on the local network, so that in the compliant equipment, regardless of the model and type of the noncompliant equipment, the noncompliant equipment can be easily configured only by executing the configuration script.

(3) When the compliant equipment transmits a configuration request containing its own identification information to the management server, configuration information can be searched for in the management server based on the identification information, so that even when the models and types, etc., of the compliant equipment and the noncompliant equipment are various, the management server can easily and reliably search for target configuration information and configuration script among a large volume of configuration information.

DETAILED DESCRIPTION OF THE PREFERRED EMBODIMENTS

Figure 1:
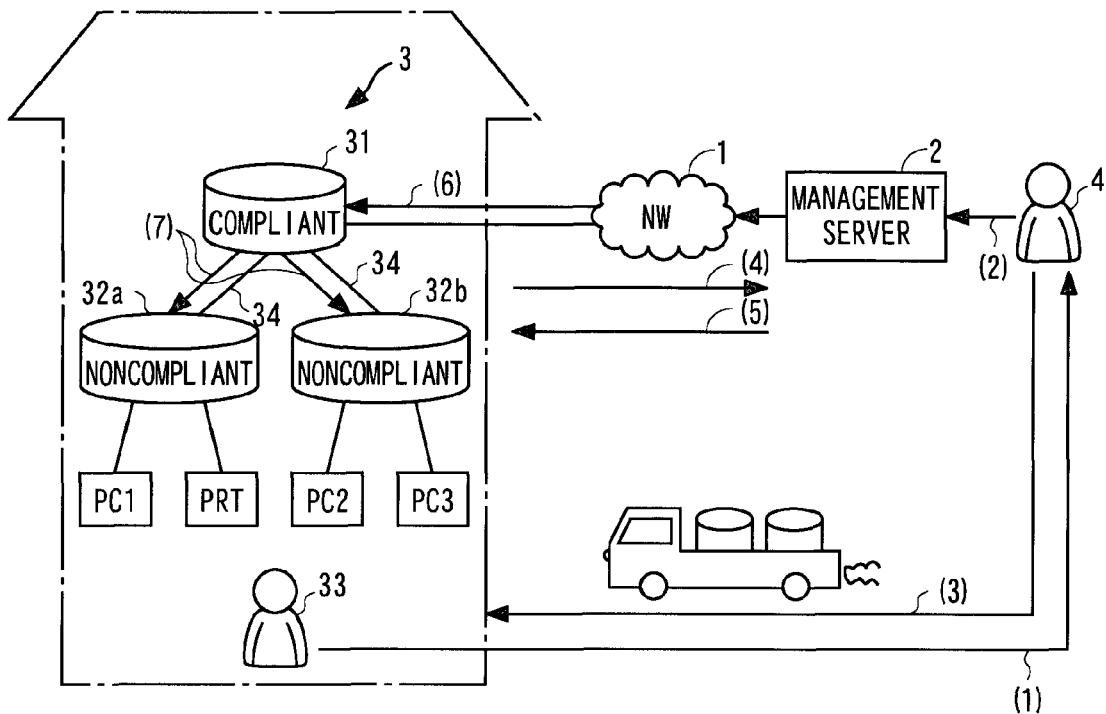
FIG. 1 is a view showing an outline of a network configuration system of the present invention.

FIG. 1 is a view showing an outline of a network configuration system of the present invention, and a management server 2 and a local network 3 are connected to a wide area network 1 such as the Internet, and the local network 3 includes compliant equipment 31 compliant with an auto-configuration protocol and noncompliant equipment 32 (32a, 32b) noncompliant with the auto-configuration protocol. The compliant equipment 31 and the noncompliant equipment 32 are connected to each other via a general-purpose communication interface 34 such as telnet, SSH, or serial connection which a general computer system includes as a standard component. Under the noncompliant equipment 32, computers PC and printers PRT are connected.

In this structure, (1) when a user 33 commissions an administrator 4 to construct the local network 3, the administrator 4 designs the local network 3 based on this commission. Then, (2) the administrator 4 registers files of configuration information of network equipment to be arranged in the local network 3 (configuration information of compliant equipment 31 and configuration information of noncompliant equipment 32) and a configuration script describing a step of automatically performing network configuration in the management server 2 by inputting the configuration files into the noncompliant equipment in the script format. Thereafter, (3) the administrator 4 sends network equipment to a user 33.

When the user 33 constructs the local network 3 by connecting the network equipment received from the administrator 4 and turns it on, (4) a configuration request message is transmitted from the compliant equipment 31 to the management server 2. (5) The management server 2 replies with the configuration file of the compliant equipment 31, the configuration file of noncompliant equipment 32, and the configuration script to the compliant equipment 31 in response to the configuration request. (6) The compliant equipment 31 configures and registers its own configuration file received from the management server 2 into itself, and then (7) configures the configuration file of noncompliant equipment 32 into the noncompliant equipment by executing the received configuration script.

In the present invention, network configuration of noncompliant equipment is realized by a script such as Shell and Expect of Unix (registered trademark), so that in the configuration steps, not only is the configuration information input into the noncompliant equipment and the existing configuration information is updated, but also, after completion of updating, normality can be verified based on whether connectivity to specific equipment is secured as a criterion, and further, when the configuration has failed, configuration information can be restored to the configuration information before being updated.

Figure 2:
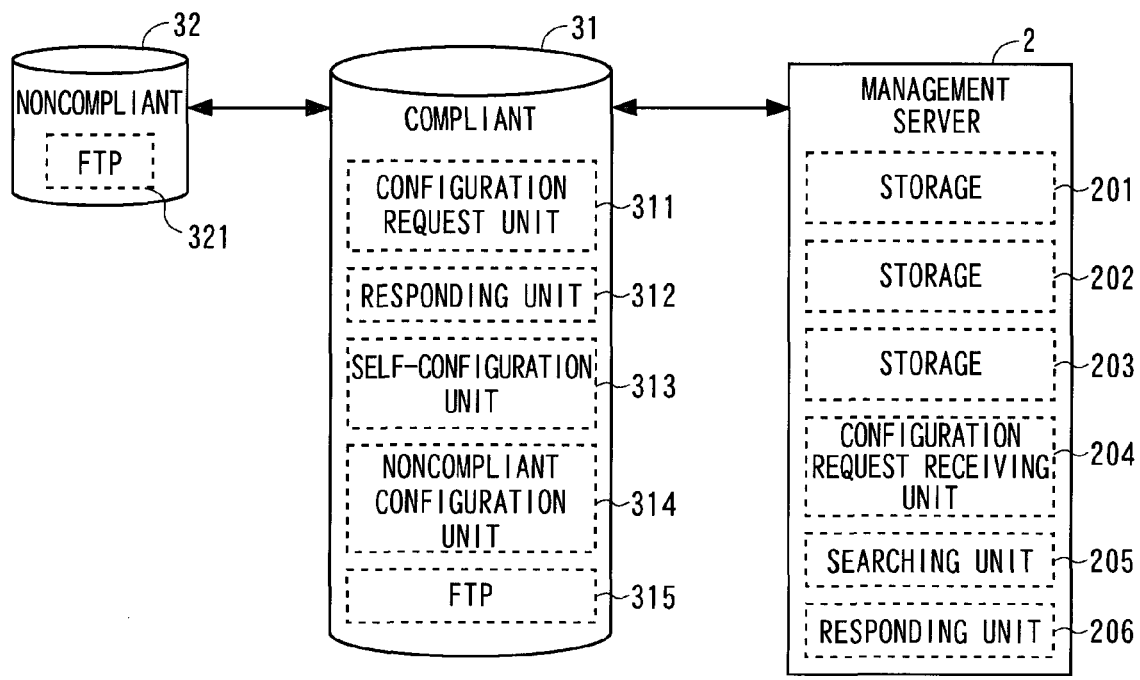
FIG. 2 is a functional block diagram showing a structure of a network configuration system of the present invention.

FIG. 2 is a functional block diagram showing a structure of a major section of the network configuration system of the present invention.

The management server 2 includes a storage 201 which stores a configuration file unique to each piece of compliant equipment by linking it to identification information of the compliant equipment, a storage 202 which stores a configuration file unique to each piece of noncompliant equipment by linking it to identification information of compliant equipment connected to each piece of noncompliant equipment, and a storage 203 which stores a configuration script describing a series of steps of transferring configuration information of the noncompliant equipment from the compliant equipment to the noncompliant equipment and automatically configuring it, in the script format.

In the respective storages 201, 202, and 203, configuration files and a configuration script are registered by being linked to identification information of each piece of compliant equipment in advance by the administrator 4. The configuration information of the noncompliant equipment contains log-in information such as an account and a password, etc., necessary for log-in to the noncompliant equipment from the compliant equipment.

The management server 2 further includes a receiving unit 204 which receives a configuration request message from the compliant equipment 31, a searching unit 205 which searches for configuration information and configuration script linked to the identification information by searching out the storages 201, 202, and 203 based on the identification information of the compliant equipment 31 included in the configuration request message received from the compliant equipment, and a responding unit 206 which replies with a configuration response message containing the searched configuration information and configuration script as a response to the configuration request message.

The compliant equipment 31 includes a configuration requesting unit 31 which generates a configuration request message containing its own identification information and transmits it to the management server 2, a receiving unit 312 which receives a configuration response message replied from the management server 2 in response to the configuration request and extracts the configuration information of the noncompliant equipment and the configuration script from the message, a self-configuring unit 313 which configures its own configuration request into itself, a configuring unit 314 which configures the configuration information of the noncompliant equipment into the noncompliant equipment 32 according to the configuration script, and a general-purpose file transfer protocol (FTP) 315 for transferring the configuration file to the noncompliant equipment 32. The configuration requesting unit 311, the receiving unit 312, the self-configuring unit 313, and the configuring unit 314 are realized according to an auto-configuration protocol installed in advance in the compliant equipment.

The noncompliant equipment 32 includes a file transfer protocol (FTP) 321 for acquiring a configuration file by communicating with the transfer protocol 315 of the compliant equipment 31.

Figure 3:
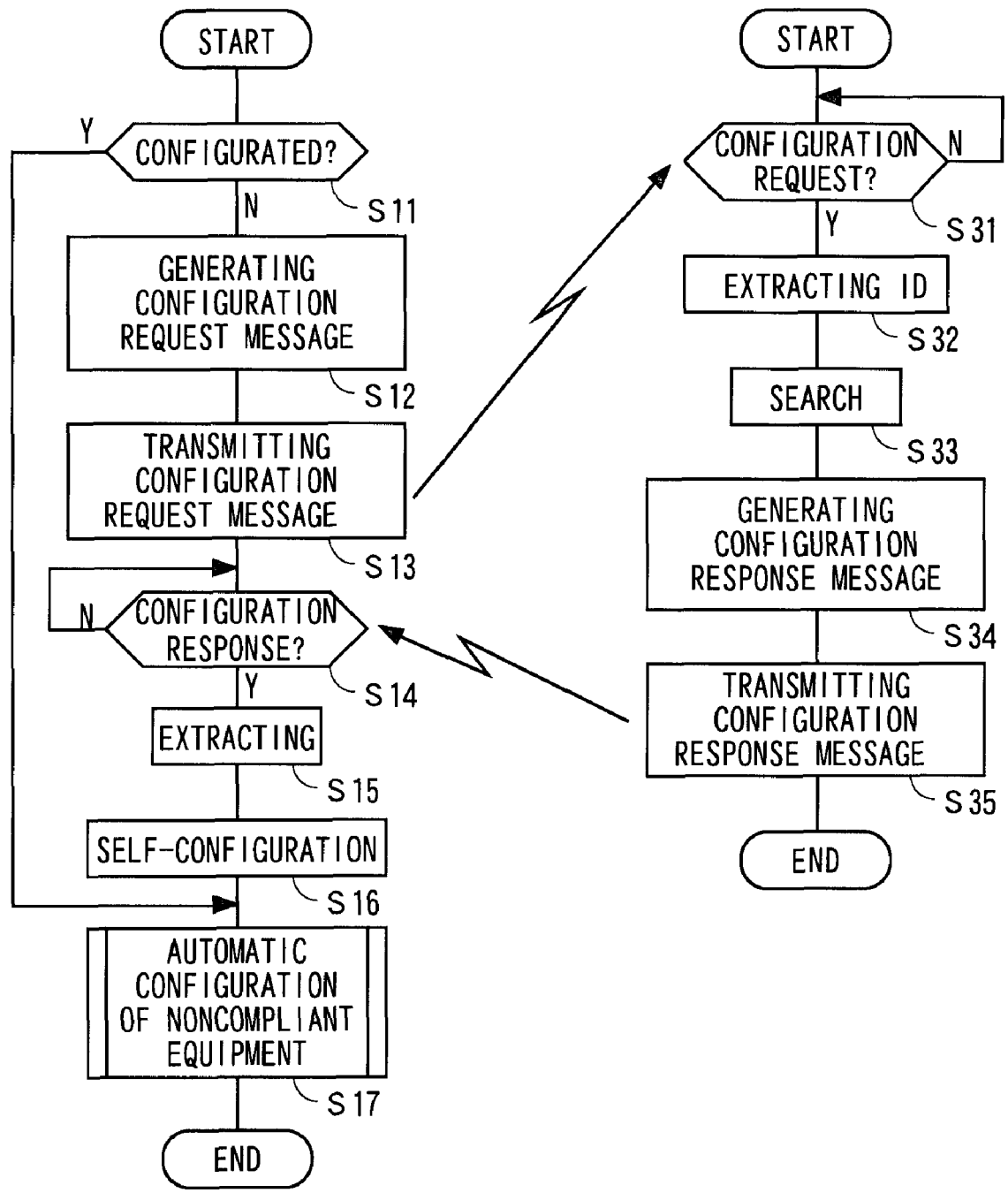
FIG. 3 is a flowchart showing operations of compliant equipment and a management server.

Next, operations of the present embodiment will be described in detail with reference to the flowchart. FIG. 3 is a flowchart showing operations of the compliant equipment 31 and the management server 2, and in the compliant equipment 31, immediately after it is turned on, the process advances to Step S11 and it is determined whether the network configurations of itself and subordinate noncompliant equipment have been completed. If the network configurations are not completed, the process advances to Step S12. In Step S12, a configuration request message containing own configuration information is generated in the configuration requesting unit 311, and an IP address of the management server 2 registered in advance is registered as a destination address of the message. In Step S13, the configuration request message is transmitted to the management server 2.

In the management server 2, when this configuration request message is received by the receiving unit 204 in Step S31, in Step S32, identification information of the compliant equipment registered in the message is extracted. In Step S33, based on this identification information, the storages 201, 202, and 203 are searched out by the searching unit 205, and a configuration file of the compliant equipment 31, a configuration file of the noncompliant equipment 32, and a configuration script are extracted.

In Step S34, a configuration response message containing configuration information of the compliant equipment 31 and the noncompliant equipment 32 and the configuration script is generated in the responding unit 206, and replied to the compliant equipment 31 in Step S35.

In the compliant equipment 31, when this configuration response message is received by the receiving unit 312 in Step S14, configuration information of its own and the noncompliant equipment 32 and the configuration script registered in the message are extracted in Step S15. In Step S16, self-configuration for configuring the own configuration information into the compliant equipment itself is performed by the self-configuring unit 313. In Step S17, the configuration script is executed by the configuring unit 314, and the noncompliant equipment 32 is automatically configured by the compliant equipment 31.

Figure 4:
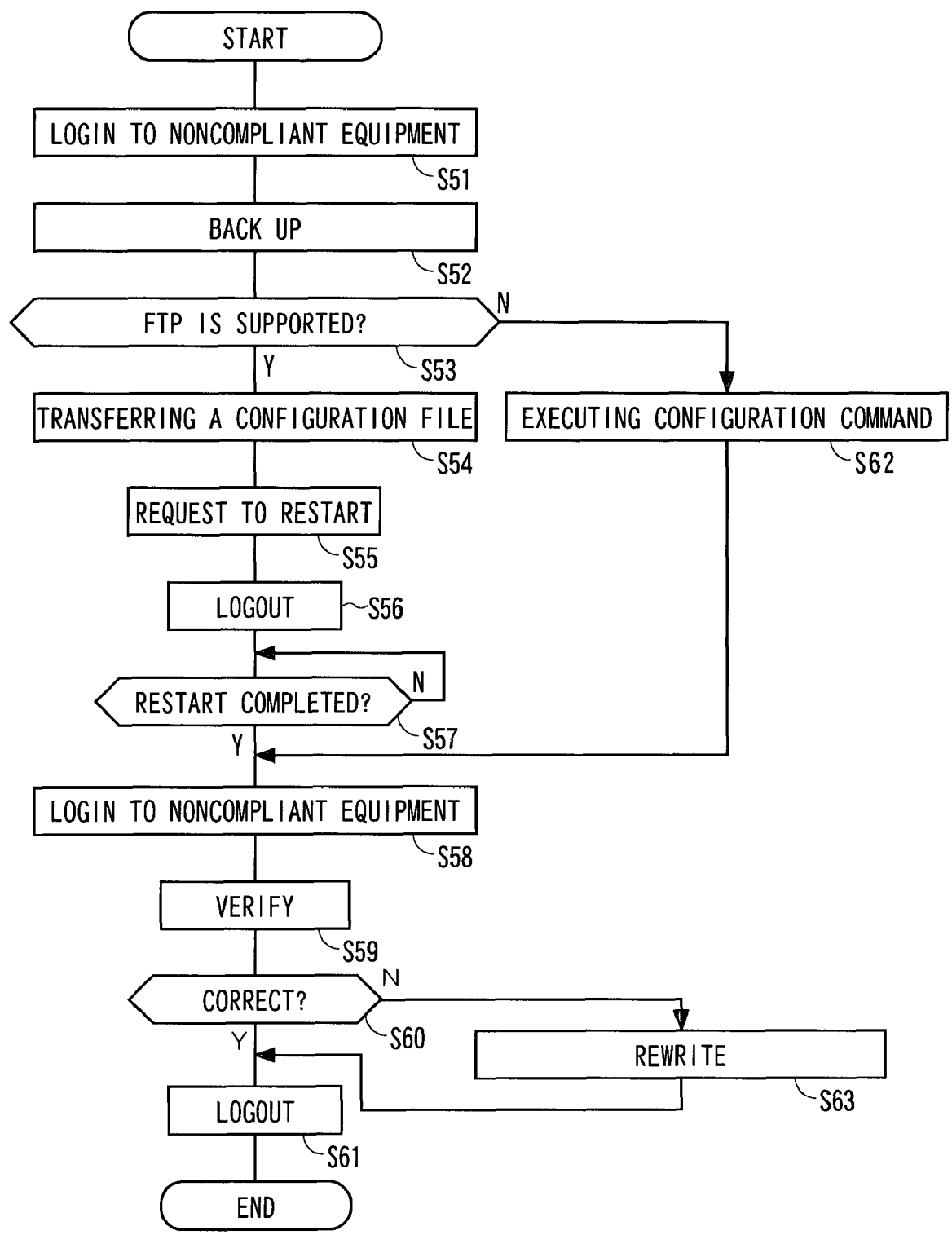
FIG. 4 is a flowchart showing auto-configuration steps according to a configuration script.
Figure 5:
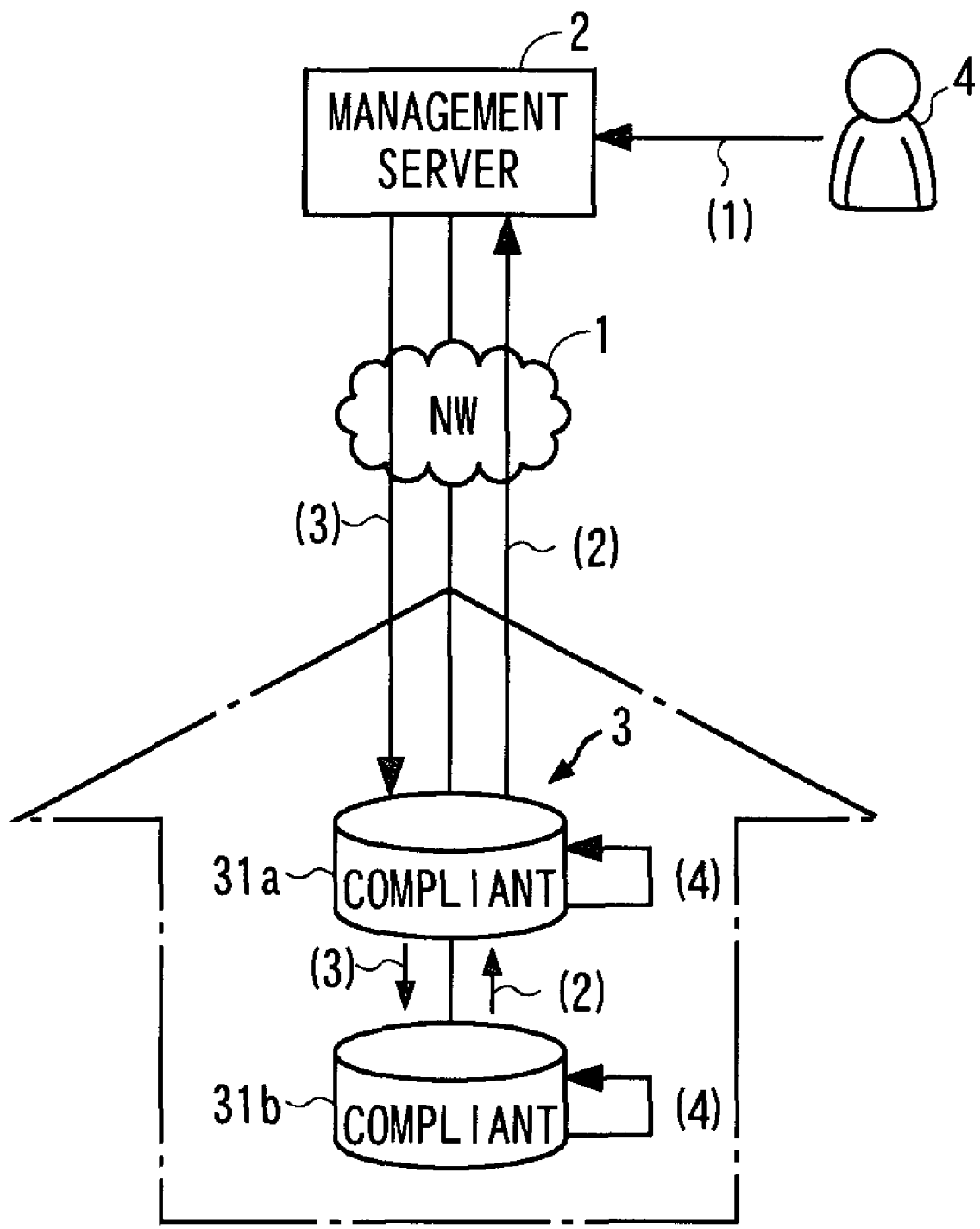
FIG. 5 is a block diagram showing a structure of a conventional network configuration system.

FIG. 4 is a flowchart showing auto-configuration steps according to the configuration script, and in Step S51, the compliant equipment 31 remotely accesses the noncompliant equipment 32, and logs in the noncompliant equipment 32 by using an account and a password acquired from the management server 2. In Step S52, the compliant equipment 31 acquires current configuration information from the noncompliant equipment 32, and saves a backup file thereof. In Step S53, it is determined whether the noncompliant equipment 32 supports a file transfer standard protocol such as FTP, and when it supports the standard protocol, the process advances to Step S54.

In Step S54, by making the noncompliant equipment 32 execute the FTP, the configuration file of the noncompliant equipment 32 acquired from the management server 2 is transferred and stored in a nonvolatile storage area of the noncompliant equipment 32. In Step S55, the compliant equipment requests the noncompliant equipment 32 to restart to enable the configuration information, and the compliant equipment logs out of the noncompliant equipment in Step S56.

In the noncompliant equipment 32, restart is performed in response to the restarting request, and when completion of restart is detected in Step S57, the process advances to Step S58. In Step S58, the compliant equipment 31 remotely accesses the noncompliant equipment 32 again, and logs in the noncompliant equipment by using the account and password acquired from the management server 2. In Step S59, after updating, it is determined whether the updated configuration file is correct, that is, normality of the configuration file is verified according to whether the connectivity to specific equipment has been secured as a criterion. When the configuration information is confirmed as correct, the compliant equipment logs out of the noncompliant equipment and ends this processing. On the other hand, when the configuration information is judged as incorrect, the process advances to Step S63. In Step S63, the configuration information of the noncompliant equipment 32 is rewritten into the configuration information backed-up in Step S52. In other words, the configuration information is restored to original content.

In the Step S53, when it is determined that the noncompliant equipment 32 does not support the file transfer protocol, the process advances to Step S62. In Step S62, by executing contents of the configuration information of the noncompliant equipment 32 acquired from the management server 2 line by line as configuration commands, the configuration information of the noncompliant equipment 32 is updated.

What is claimed is:

1. A network configuration method in which a management server and a local network are connected to a network, and compliant and noncompliant equipment which are arranged on the local network and compliant with and noncompliant with an auto-configuration protocol are automatically configured via the network from the management server, comprising the steps of:

the compliant equipment transmitting a configuration request via the network to the management server;

the management server replying with configuration information of compliant equipment and configuration information of noncompliant equipment in response to the configuration request;

the compliant equipment receiving the configuration information of compliant equipment and the configuration information of noncompliant equipment from the management server;

the compliant equipment configuring the received configuration information of compliant equipment into the compliant equipment;

the compliant equipment establishing a communication channel between the compliant equipment and the noncompliant equipment;

the compliant equipment configuring the received configuration information of the noncompliant equipment into the noncompliant equipment via the communication channel;

the compliant equipment determining whether the noncompliant equipment supports a file transfer protocol or not;

the compliant equipment making the noncompliant equipment execute the file transfer protocol so that the configuration file is transferred to the noncompliant equipment when the noncompliant equipment supports the file transfer protocol; and the compliant equipment executing contents of the configuration information of the noncompliant equipment line by line as configuration commands when the noncompliant equipment does not support the file transfer protocol.

2. The network configuration method according to claim 1, comprising the step of:

a step in which the management server replying with a configuration script describing steps of configuring the noncompliant equipment by the compliant equipment in response to the configuration request, wherein the compliant equipment configures the noncompliant equipment according to the configuration script.

3. The network configuration method according to claim 1, wherein the compliant equipment transmits a configuration request containing its own identification information to the management server, and the management server replies with configuration information of the compliant equipment linked to the identification information contained in the received configuration request and configuration information of the noncompliant equipment.

4. The network configuration method according to claim 2, wherein the compliant equipment transmits a configuration request containing its own identification information to the management server, and the management server replies with configuration information of the compliant equipment linked to the identification information contained in the received configuration request, configuration information of the noncompliant equipment, and a configuration script.

5. A network configuration system in which a management server and a local network are connected to a network, and compliant and noncompliant equipment which are arranged on the local network and compliant with and noncompliant with an auto-configuration protocol are automatically configured via the network from the management server, wherein:

the compliant equipment includes:

means for transmitting a configuration request via the network to the management server;

means for receiving configuration information of the compliant equipment and configuration information of the noncompliant equipment replied from the management server in response to the configuration request;

means for configuring the received configuration information of the compliant equipment into the compliant equipment;

means for establishing a communication channel between the compliant equipment and the noncompliant equipment;

means for configuring the received configuration information of the noncompliant equipment into the noncompliant equipment via the communication channel;

means for determining whether the noncompliant equipment supports a file transfer protocol or not;

means for making the noncompliant equipment execute the file transfer protocol so that the configuration file is transferred to the noncompliant equipment when the noncompliant equipment supports the file transfer protocol; and means for executing contents of the configuration information of the noncompliant equipment line by line as configuration commands when the noncompliant equipment does not support the file transfer protocol, and the management server includes:

means for replying configuration information of compliant equipment and configuration information of noncompliant equipment in response to a configuration request received from the compliant equipment.

6. The network configuration system according to claim 5, wherein the management server includes means for replying with a configuration script describing a step of configuring noncompliant equipment by compliant equipment in response to the configuration request, and the compliant equipment configures the noncompliant equipment according to the configuration script received from the management server.

* * * * *